United States Patent [19]
Kanda

[11] Patent Number: 6,091,528
[45] Date of Patent: Jul. 18, 2000

[54] OPTICAL COMMUNICATION SYSTEM OF SPACE PROPAGATION TYPE

[75] Inventor: Seiji Kanda, Tokyo, Japan

[73] Assignee: Kabushiki Kaisha Toshiba, Kawasaki, Japan

[21] Appl. No.: 08/992,366

[22] Filed: Dec. 17, 1997

[30] Foreign Application Priority Data

Dec. 17, 1996 [JP] Japan ..................................... 8-336940
Dec. 15, 1997 [JP] Japan ..................................... 9-345098

[51] Int. Cl.[7] .................................................. H04B 10/00
[52] U.S. Cl. ........................... 359/159; 359/152; 359/172
[58] Field of Search .................................... 359/152, 159, 359/172, 143, 180, 189

[56] References Cited

U.S. PATENT DOCUMENTS 3,511,998  5/1970  Smokler ................................... 359/159
5,142,400  8/1992  Solinsky .................................. 359/159
5,465,170  11/1995  Arimoto .................................. 359/159
5,594,580  1/1997  Sakanaka et al. ....................... 359/172

OTHER PUBLICATIONS

Baister et al., "Pointing, acquisition and tracking for optical space communications", Electronics & Communication Engineering Journal, Dec. 1994. pp. 271–280.

Primary Examiner—Kinfe-Michael Negash
Attorney, Agent, or Firm—Oblon, Spivak, McClelland, Maier & Neustadt, P.C.

[57] ABSTRACT

Optical cables, which are connected to a light receiving section and a light transmitting section, respectively, are provided to be opposite to each other in three-axis directions to be freely movable and adjustable to image forming lenses of a receiving optical system and a transmitting optical system, respectively. The optical fiber is driven based on light intensity of receiving light to be three-dimensionally moved and adjusted so as to optically combined with the image forming lens, and the optical fiber is driven based on a light angle of the receiving light and aberration to be three-dimensionally moved and adjusted so as to optically combined with the image forming lens.

36 Claims, 4 Drawing Sheets

OPTICAL COMMUNICATION SYSTEM OF SPACE PROPAGATION TYPE

BACKGROUND OF THE INVENTION

The present invention relates to an optical communication system for executing an optical communication between vehicles such as satellites, space stations, space shuttles by use of a space propagation.

Generally, in an optical communication system, there is used an optical fiber type in which communication stations are connected to each other with an optical fiber cable, the optical fiber cable is used as a transmission line to execute an optical communication between the communication stations. In this type of the optical communication system, the capacity of communication can be largely increased as compared with the conventional RF communication.

In the field of the space development, the diversity of communication such as a satellite communication has been recently developed, and an increase in capacity of communication is required. In the field of the space development, there is an idea in which the optical communication system is constructed between the space vehicles to improve the communication capacity.

As such an optical communication system, there is considered and studied a system in which communication light is transmitted to a communication counterpart by use of a space propagation without forming an optical fiber cable. In such an optical communication system, light propagated in space is received and transmitted by an optical antenna to be guided to an optical signal processing system. In this case, the directivity of the optical antenna is controlled to a communication direction with highly accuracy.

For example, as shown in FIG. 5, a housing 1 is provided in a space vehicle 50 through gimbals 2 for coarsely tracking to be freely tracked. The housing 1 has an optical antenna 3. Also, the housing 1 has a tracking mirror 4 and a first beam splitter 5. The tracking mirror 4 is formed such that one input/output (I/O) optical path faces to the optical antenna 3. The first beam splitter 5, which constitutes a light receiving optical system, is formed on the other I/O optical path to face to the input line.

The gimbals 2 controls the movement of the housing 1 based on a coarse tracking command from a sensor (not shown). For example, the directivity of the optical antenna 3 is coarsely tracked to a communication counterpart station 52, which is constructed in the other space vehicle 51.

An image forming lens 6 is provided on one output line of the first beam splitter 5, and an optical receiving section 7 such as an APD (Avalanche Photo Diode) is provided on the back stage of the lens 6. A receiving signal processing section 8 is connected to the output terminal of the optical receiving section 7. The optical receiving section 7 photo-electrically converts input receiving light and outputs it to the receiving signal processing section 8.

A light angle detecting section 9 is formed on the other output line of the first beam splitter 5 through a beam splitter 10. A drive controlling section 11 is connected to an output terminal of the light angle detecting section 9. A receiving light from the first beam splitter 5 is guided through a second beam splinter 10, and the light angle of the receiving light is detected by the light angle detecting section 9. Then, light angle data is output to the drive control section 11. The drive control section 11 generates a tacking mirror drive signal based on input light angle data, and controls a tracking angle of the tracking mirror 41 thereby precisely tracking the communication counterpart station 52.

An image forming lens 13 is provided on an input line of the second beam splitter 10 through an aberration correction mirror 12. A light transmitting section 14 such as LD (Laser Diode) is provided on the back stage of the image forming lens 13. The light transmitting section 14 converts an electrical signal input through a transmitting signal processing section 15 to light so as to be supplied to the image forming lens 13.

The above transmitting light is guided to the optical antenna 3 through the aberration correcting mirror 12, the second beam splitter 10, the first beam splitter 5, and the tracking mirror 4 so as to be transmitted toward the communication counterpart station 52. In this case, the angle of the aberration correcting mirror 12 is controlled based on the space vehicles 50 and 51, and the aberration of the transmitting light is corrected.

The aberration data is calculated by a calculating section 17 based on light angle data detected by the light angle detecting section 9 and light data of transmitting light reflected by a corner cube reflector (CCR) 16 provided on the other output terminal of the second beam splitter 10.

Also, the housing 1 has a beacon optical system 18 facing to the optical antenna 3. The beacon optical system 18 is connected to a beacon beam emitting section 19. Beacon light is transmitted from the beacon beam emitting section 19 to an optical antenna 3.

In the above-explained optical communication system, the rate of communication data is high, and the using current of the light receiving section 7, serving as a heat source, and that of the light transmitting section 14 become large current. Due to this, measurements against heating must be taken to prevent the optical system from being influenced by heating. Moreover, since modulation frequencies of the signal processing sections 8 and 15 are increased, measurements against electromagnetic interference must be taken. Due to this, there occurs a problem in which the size of the device is increased, and its weight is increased.

Furthermore, it is difficult to position the light receiving section 7 and the light transmitting section 14 not to exert unfavorable influence on the optical system. Due to this, there occurs a problem in which a frequency characteristic is reduced.

The above-mentioned problems are the important subjects to be solved in the field of the space development, which demands the diversity of communication and the reduction in the size and weight of the device.

BRIEF SUMMARY OF THE INVENTION

An object of the present invention is to provide an optical communication system whose structure is simplified to reduce its size and weight, thereby realizing a highly accurate optical communication having high reliability.

The above object can be achieved by the following structure.

Specifically, there is provided an optical communication system comprising:

an optical antenna, mounted on a space vehicle space, for receiving and transmitting light for an optical communication from/to a communication counterpart station;

coarsely tracking means for tracking the communication counterpart station based on a tracking command to control an optical input and output of the optical antenna;

precisely tracking optical system, provided at a back stage of the optical antenna, for controlling an I/O (input/ output) optical path of the optical antenna based on a light angle of light, which is guided to the antenna by tracking the communication counterpart station by the coarsely tracking means and sent from the communication counterpart station, so as to precisely track the communication counterpart station;

a receiving optical system for receiving light, which is received by the optical antenna whose I/O optical path is controlled by the precisely tracking optical system, and sent from the communication counterpart station;

a light receiving section for inputting light, which is made incident onto the receiving optical system and sent from the communication counterpart station;

a first optical fiber cable, having one end positioned to be opposite to an output terminal of the receiving optical system to be adjustable, for guiding light incident onto the receiving optical system to the light receiving section;

first position adjusting means for adjusting a relative position between one end of the first optical fiber cable and the output terminal of the receiving optical system based on light intensity of light input from one end of the first optical fiber cable;

a light transmitting section for outputting transmitting light;

a transmitting optical system for guiding transmitting light output from the light transmitting section to the optical antenna through the precisely tracking optical system to be transmitted to the communication counterpart station;

a second optical fiber cable, having one end positioned to be opposite to an input terminal of the transmitting optical system to be adjustable, for guiding transmitting light transmitted from light transmitting section;

second position adjusting means for adjusting a relative position between one end of the second optical fiber cable and the input terminal of the transmitting optical system based on an angle of light input from one end of the first optical fiber cable and aberration between the space vehicle and the communication counterpart station; and beacon beam transmitting means for outputting a beam con beam to the optical antenna to be transmitted to the communication counterpart station.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will now be described with reference to the accompanying drawings.

Figure 1:
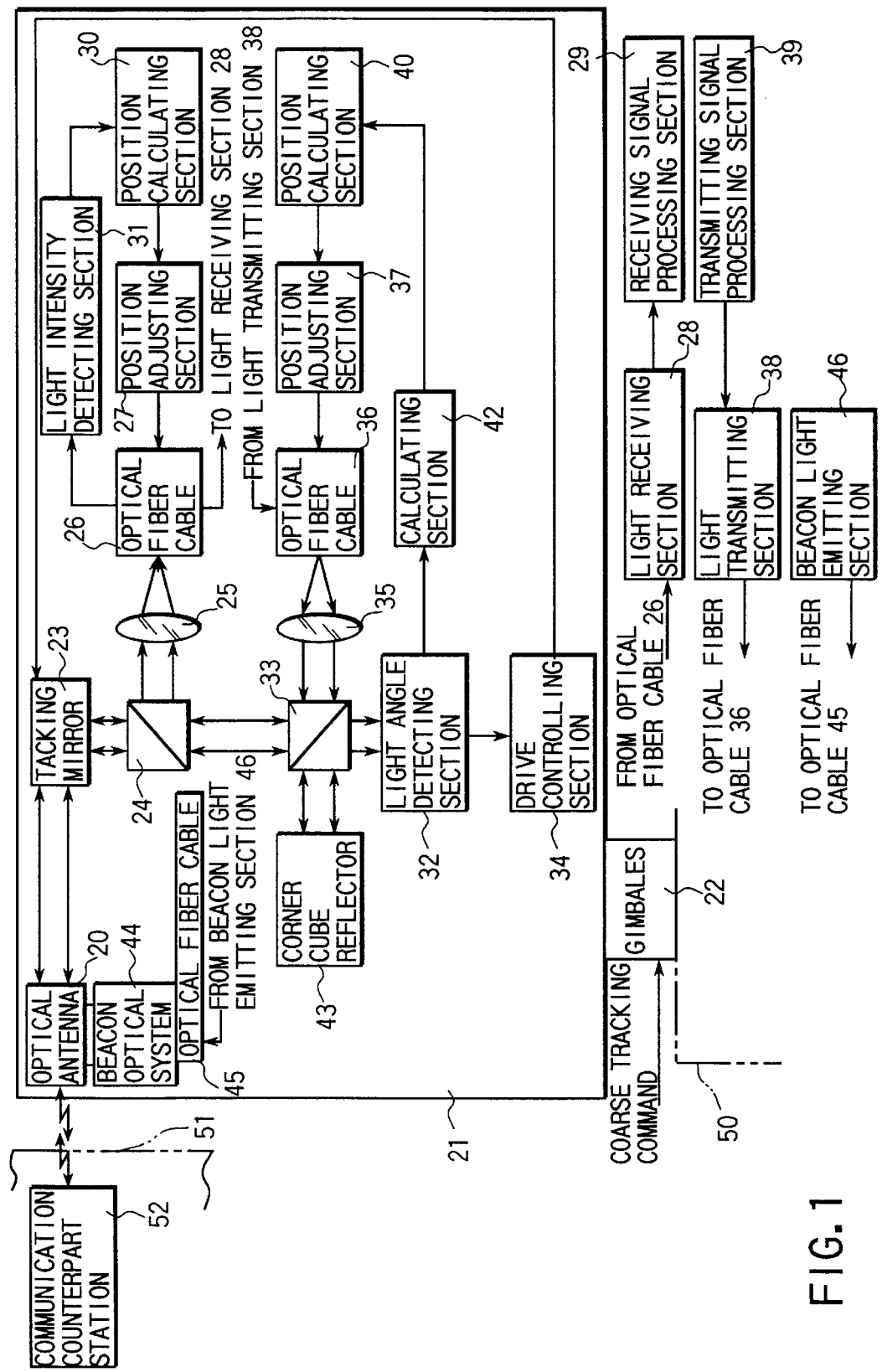
FIG. 1 is a block diagram showing an optical communication system according to one embodiment of the present invention.

FIG. 1 is a block diagram showing an optical communication system according to one embodiment of the present invention. An optical antenna 20 for an optical communication, which is formed of an optical system, is contained in a housing 21. The housing 21 is mounted on a space vehicle 50 through gimbals 22 for coarsely racking. A tracking mirror 23 is provided on an optical path of the antenna 20 such that one I/O (input/output) optical path faces to the optical antenna 20. Then, a first beam splitter 24 is provided on the other I/O optical path to face to the input line.

The gimbals 22 controls the movement of the housing 21 based on a coarse tracking command from a sensor (not shown). For example, the directivity of the optical antenna 20 is coarsely tracked to a communication counterpart station 52, which is constructed in other space vehicle 51.

Figure 2:
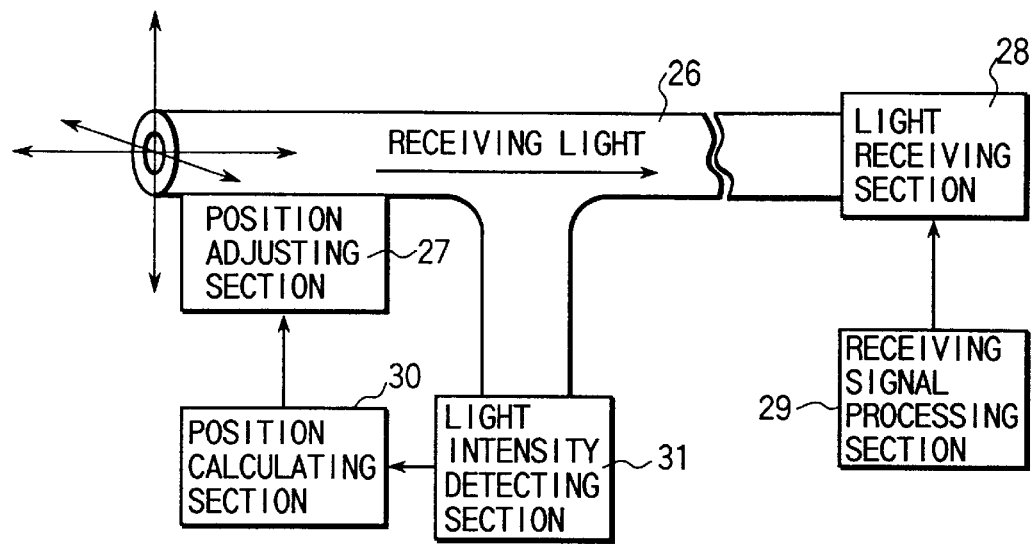
FIG. 2 is a block diagram showing the details of a receiving system of FIG. 1.

An image forming lens 25 is provided on one output line of the first beam splitter 24. One end of an optical fiber cable 26 is formed to face to the image forming lens 25. As shown in FIG. 2, one end portion of the optical fiber cable 26 is provided in three-axis directions (three-dimensionally), which are substantial perpendicular to the image forming lens 25, to be freely movable and adjustable through a position adjusting section 27 formed of a piezoelectric element. The other end is extended from the housing 21 to be connected to a light receiving section 28 such as APD (Avalanche Photo Diode) (FIG. 1). Then, a receiving signal processing section 29 is connected to the light receiving section 28.

The light receiving section 28 photoelectrically converts the receiving light input through the optical fiber cable 26 to be output to the receiving signal processing section 29. These light receiving section 28 and the receiving signal processing section 29 are positioned to be separated from the housing 21, and optically combined with the image forming lens 25 of the optical system through the optical fiber cable 26.

A position calculating section 30 is connected to the position adjusting section 27, and an output terminal of a light intensity detecting section 31 is connected to one input terminal.

The light intensity detecting section 31 detects light intensity of the receiving light received through the optical fiber cable 26 to be output to the position calculating section 30.

A light angle detecting section 32 is provided on the other output line of the first beam splitter 24 through a beam splitter 33, and a drive control section 34 is connected to an output terminal of the light angle detecting section 32. A receiving light from the first beam splitter 24 is guided through the second beam splitter 33, and the light angle of the receiving light is detected by the light angle detecting section 32. Then, light angle data is output to the drive control section 34. The drive control section 34 generates a tacking mirror drive signal based on input light angle data, and controls a tracking angle of the tracking mirror 23, thereby precisely tracking the communication counterpart station 52 of the space vehicle 51.

Figure 3:
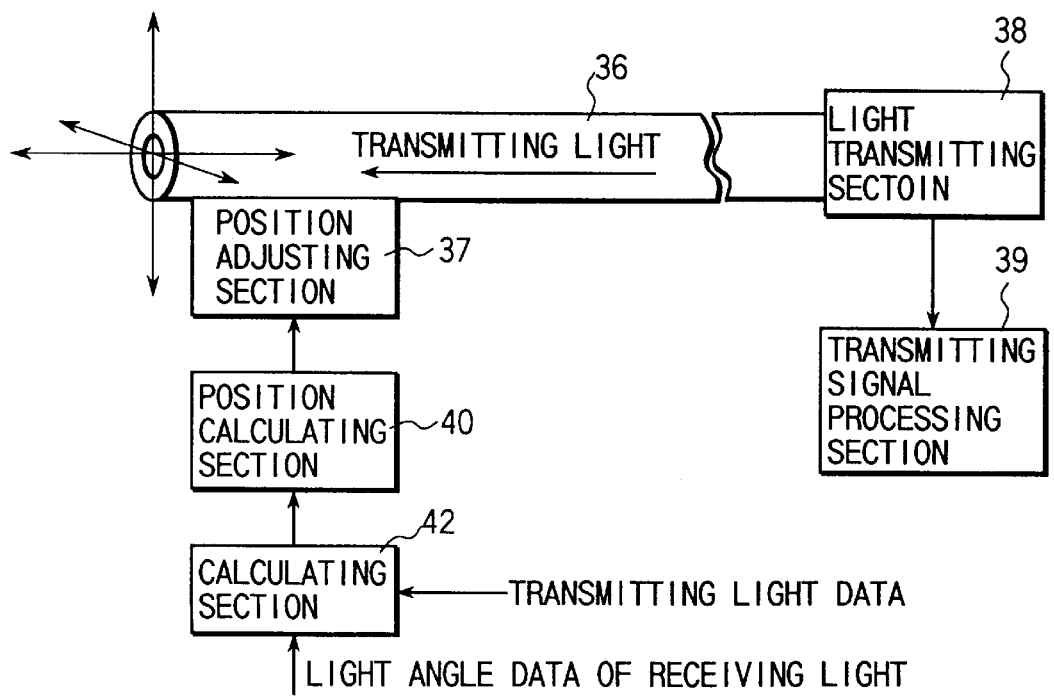
FIG. 3 is a block diagram showing the details of a transmitting system of FIG. 1.

An image forming lens 35 is provided on an input line of the second beam splitter 33. One end of an optical fiber cable 36 is formed to face to the image forming lens 35. As shown in FIG. 3, one end portion of the optical fiber cable 36 is provided in three-axis directions (three-dimensionally), which are substantially perpendicular to the image forming lens 35, to be freely movable and adjustable through a position adjusting section 37 formed of a piezoelectric element. The other end is connected to a light transmitting section 38 such as APD (Avalanche Photo Diode) (FIG. 1). Then, a transmitting signal processing section 39 is connected to the light receiving section 38.

The light transmitting section 38 photoelectrically converts a transmission control signal to generate a transmitting light. Then, the transmitting light is output to the optical fiber cable 36. These light transmitting section 38 and the transmitting signal processing section 39 are positioned to be separated from the housing 21, and optically combined with the image forming lens 35 of the optical system through the optical fiber cable 36.

An output terminal of a position calculating section 40 is connected to the position adjusting section 37, and an output terminal of a calculating section 42 to be described later is connected to an input terminal of the position calculating section 40.

A corner cube reflector (CCR) 43 is provided to the other end terminal of the second beam splitter 33. CCR 43 outputs light data of transmitting light, which is input through the second beam splitter 33, to the calculating section 42 through the light angle detecting section 32.

The light angle detecting section 32 is connected to the calculating section 42, and light angle data is input from the light angle detecting section 32. The calculating section 42 calculates aberration between the space vehicles 50 and 51 based on input light angle data and light data, and calculated aberration data is output to the position calculating section 40.

The position calculating section 40 calculates each of the three-dimensional positions of the optical fiber 36 based on aberration data calculated by the calculating section 42 and the light angle detected by the light angle detecting section 32. The position adjusting section 37 is drive-controlled based on position data. Then, one end of the optical fiber cable 33 is three-dimensionally adjusted to the image forming lens 35 so as to be optically combined with each other.

Moreover, a beacon optical system 44 is provided in the housing 21 to face to the optical antenna 20. One end of an optical fiber cable 45 is connected to the beacon optical system 44, and a beacon beam emitting section 46 is connected to the other end of the optical fiber cable 44. The beacon beam emitting section 46 is positioned to be separated from the beacon optical system 44 through the optical fiber cable 45. Then, the beacon beam emitting section 46 outputs the beacon beam to the optical antenna 20 through the optical fiber cable 45 and the beacon optical system 44.

According to the above-mentioned structure, if the transmitting signal from the transmitting signal processing section 39 is input to the light transmitting section 38, the light transmitting section 38 photoelectrically converts the transmitting signal to be output to the optical fiber cable 36. Then, the signal is output to the image forming lens 35 through the optical fiber cable 36. The transmitting signal is image-formed by the image forming lens 35. Thereafter, the image-formed signal is guided to the optical antenna 20 through the second beam splitter 33, the first beam splitter 24, the tracking mirror 23 to be transmitted in the direction of the communication counterpart station 52 from the optical antenna 20.

In this case, the gimbals 22 is driven based on the coarse tracking command and the directivity of the optical antenna 20 is controlled through the housing 21, that is, a coarse tracking is performed. Moreover, the tracking mirror 23 is controlled based on light angle data from the light angle detecting section 32, that is, a precise tracking is performed. Thereby, the tracking of the communication counterpart station 52 of the space vehicle 51 is performed. At this time, the optical antenna 20 transmits the beacon beam, which is input from the beacon beam emitting section 46 through the optical fiber cable 45 and the beacon optical system 44, to the communication counterpart station 52 of the space vehicle 51.

On the other hand, the communication counterpart station 52 transmits communication light (receiving light) to the beacon beam. As a result, the optical antenna 20 receives the receiving light from the communication counterpart station 52. Then, the receiving light is guided to the image forming lens 25 through the tracking mirror 23 and the first beam splitter 24, and image-formed so as to be input to the optical fiber cable 26. The receiving light input to the optical fiber cable 26 is input to the light receiving section 28 to be photoelectrically converted. Thereafter, the photoelectrically converted light is input to the receiving signal processing section 29. Thereby, communication data can be obtained from the communication counterpart station 52.

In this case, the receiving light input to the optical fiber cable 26 is partially input to the light intensity detecting section 31. The light intensity detecting section 31 detects light intensity of the receiving light, and outputs the obtained light intensity data to the position calculating section 30. The position calculating section 30 drives the position adjusting section 27 such that receiving light intensity of the optical fiber cable 26 becomes maximum based on the input light intensity data. As a result, the position of the optical fiber cable 26 is three-dimensionally controlled, and the positional relationship between the optical fiber cable 26 and the image-forming lens 25 is set.

At the same time, the receiving light is input to the light angle detecting section 32 through the first and second beam splitters 24 and 33. The light angle detecting section 32 detects the light angle of the input receiving light so as to be output to the drive controlling section 34 and the calculating section 42. The drive controlling section 34 controls the drive of the tracking mirror 23 based on the light angle data, thereby executing the precise tracking of the communication counterpart station 52 of the space vehicle 51.

Then, the transmitting light is input to the CCR 43 through the second beam splitter 33. The CCR 43 outputs light data of the input transmitting light to the calculating section 42 through the light angle detecting section 32. The calculating section 42 obtains aberration between the space vehicles 50 and 51 based on the light angle data from the detecting section 32 and light data from the CCR 43. Then, obtained aberration data is output to the position calculating section 40.

At the same time, light angle data obtained by the light angle detecting section 32 is input to the position calculating section 40 through the calculating section 42. The position adjusting section 37 is driven based on light angle data and aberration data. As a result, the position of the optical fiber cable 36 is three-dimensionally controlled, and the positional relationship between the optical fiber cable 36 and the image-forming lens 35 is set.

Thus, according to the above-explained optical communication system, the optical fiber cables 26 and 36, which are connected to the light receiving section 28 and the light transmitting section 38, are provided in three-axis directions (three-dimensionally), which are substantially perpendicular to the image forming lens 25 and 35, to be freely movable and adjustable, respectively. Then, the drive of the position adjusting section 27 is controlled based on the light intensity data of the receiving light. As a result, the position of the optical fiber cable 26 is three-dimensionally controlled so as to be optically combined with the image forming lens 25. Also, the position of the optical fiber cable 36 is three-dimensionally controlled based on the light angle of the receiving light and aberration so as to be optically combined with the image forming lens 35.

Moreover, since the optical system and the light receiving section 28 and the light transmitting section 38 can be separately arranged, the highly accurate optical communication having high reliability can be realized. As a result, there is no need of taking measurements against the heating of the light receiving section and the light transmitting section 38 and measurements against the electromagnetic interference, so that the reduction in the size and weight of the device can be improved.

Figure 5:
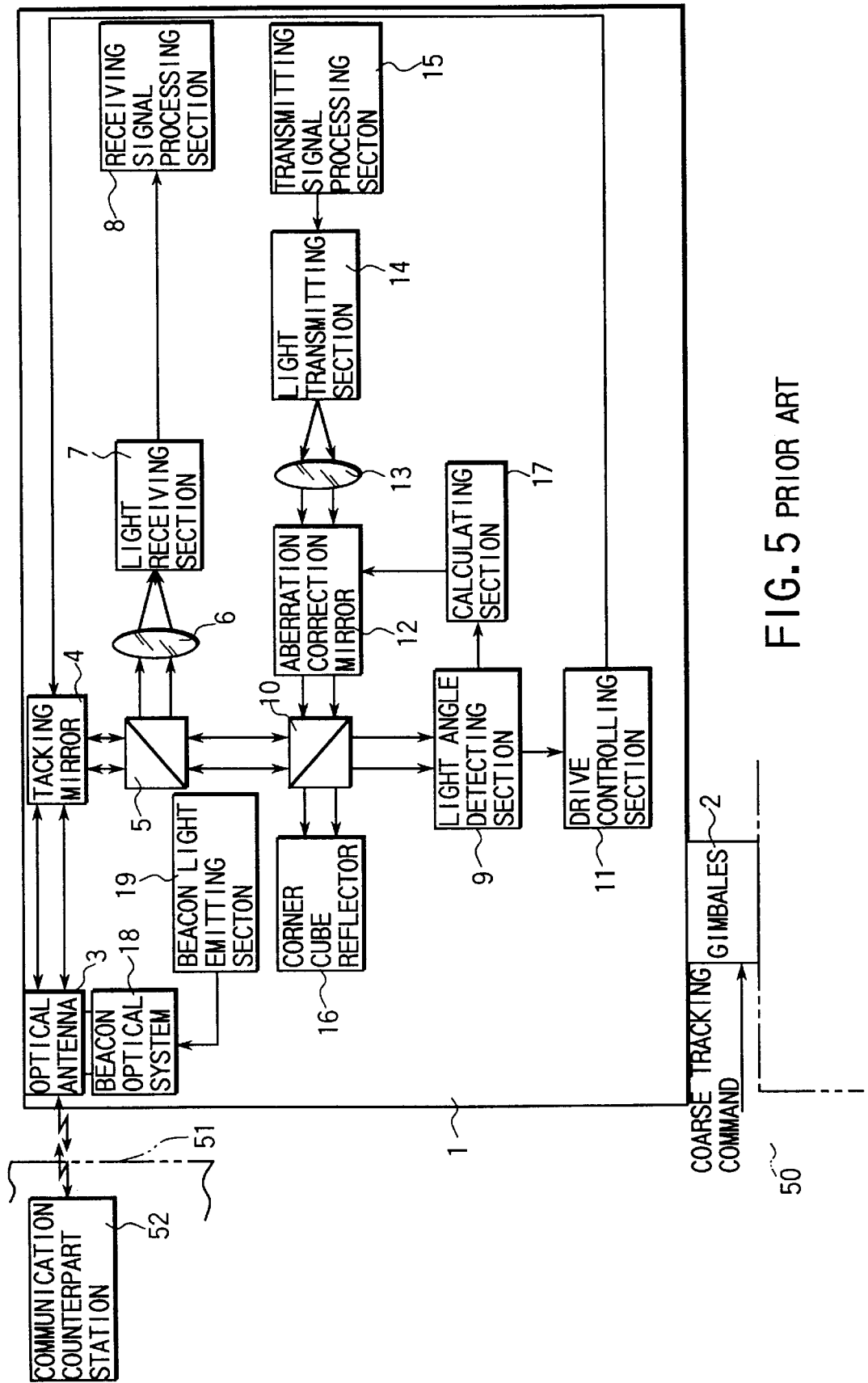
FIG. 5 is a block diagram showing a conventional optical communication system.

Moreover, unlike the prior art, the aberration correction can be realized without providing the aberration correction mirror 12 (FIG. 5), so that the reduction in the size and weight of the device can be improved.

The above embodiment explained the case in which the movement of the housing 21 was controlled by gimbals 22. However, the present invention is not limited to this embodiment. For example, the present invention can be structured as shown in FIG. 4.

Figure 4:
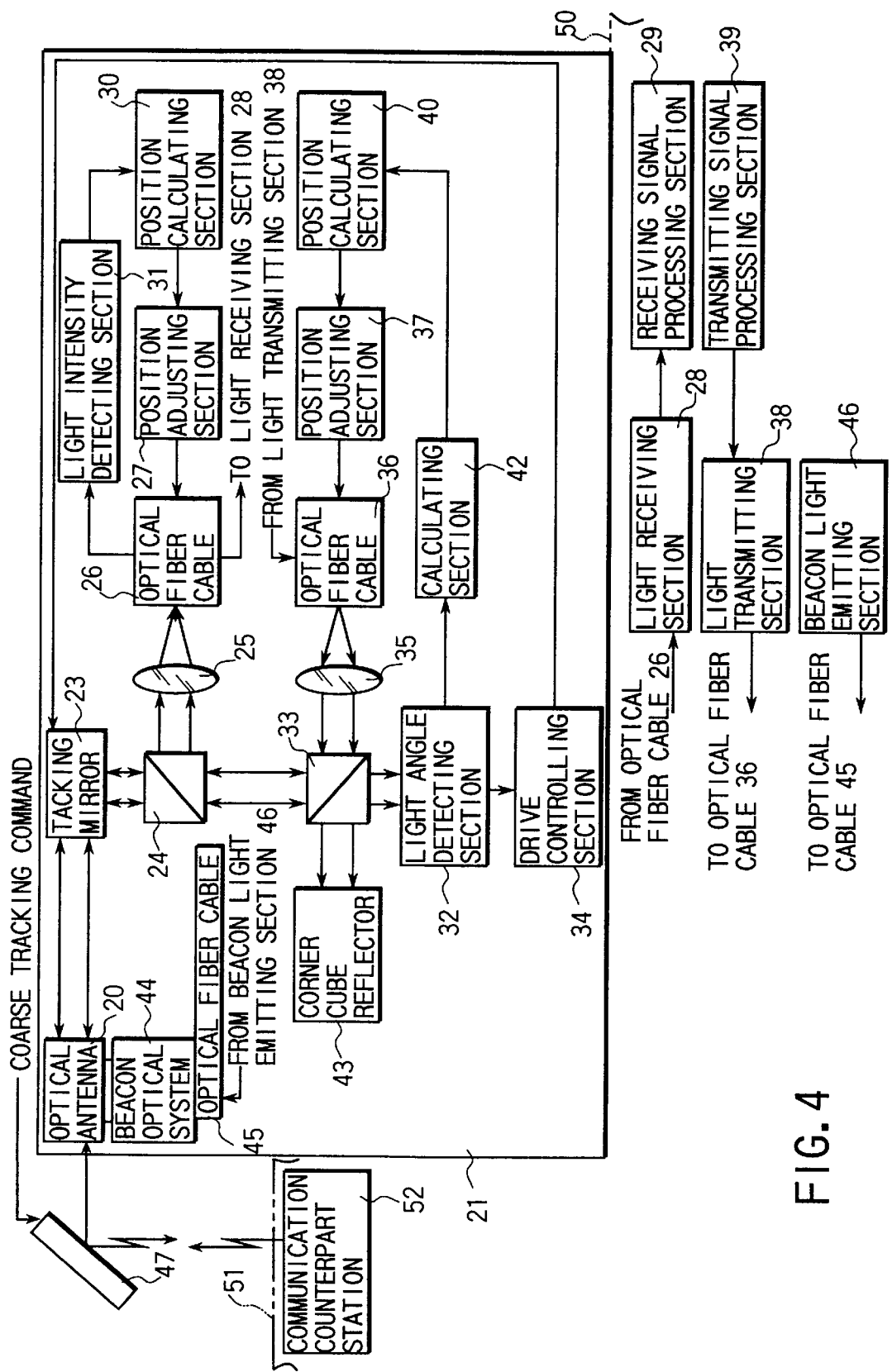
FIG. 4 is a block diagram showing an optical communication system according to the other embodiment.

Specifically, in an embodiment shown in FIG. 4, a coarse tracking mirror 47 is provided in the outer section of the housing 21. Then, the coarse tracking mirror 47 is driven based on a coarse tracking command to coarsely track the communication counterpart station 52. Thereby, the optical communication with the communication counterpart station 52, and substantially the same technical advantage as the embodiment of FIG. 1 can be expected.

In the embodiment of FIG. 4, the structure other than the coarse tracking mirror 47 is substantially the same as the case of FIG. 1. Then, the same reference numerals are added to the same portions common to the case of FIG. 1, and the explanation is omitted.

The above embodiment explained the case in which the optical fiber cable 45 is directly connected to the beacon optical system 44. The present invention is not limited to the above case. Similar to the optical fiber cables 26 and 36 of the receiving optical cable 45 and the transmitting optical system, the optical fiber cable 45 is positioned to be opposite to the beacon optical system 44 to be freely movable and adjustable. Thereby, the optical fiber cable 45 can be controlled to be optically combined with the beacon optical system 44.

Moreover, the above embodiment explained the case in which end portion of each of the optical fiber cable 26 and 36 is adjusted to be moved in three-axis directions (three-dimensionally) to be optically combined with the image forming lenses 25 and 35. However, the present invention is not limited to the above case. Both optical fiber cables 26, 36 and the optical system including the image forming lenses 25 and 35 can be independently moved to be optically combined with each other.

Additional advantages and modifications will readily occurs to those skilled in the art. Therefore, the invention in its broader aspect is not limited to the specific details and representative devices shown and described herein. Accordingly, various modifications may be made without departing from the spirit or scope of the general inventive concept as defined by the appended claims and their equivalents.

What is claimed is:

1. An optical communication system comprising:

an optical antenna, mounted on a space vehicle, for receiving and transmitting light for use in an optical communication from and to a communication counterpart station;

coarsely tracking means for controlling said optical antenna based on a tracking command by moving an I/O (input/output) optical path of said optical antenna, so as to coarsely track the communication counterpart station;

a precisely tracking optical system configured to control the I/O optical path of said optical antenna based on an angle of light transmitted from the communication counterpart station coarsely tracked by said coarsely tracking means, so as to precisely track the communication counterpart station;

a receiving optical system configured to receive the light which is transmitted from the communication counterpart station to said optical antenna whose I/0 optical path is controlled by said precisely tracking optical system;

a light receiving section configured to receive the light received by said receiving optical system;

a first optical fiber cable configured to guide the light received by said receiving optical system to said light receiving section, said first optical fiber cable having one end located opposite to said receiving optical system such that said one end of said first optical fiber cable is adjustably movable;

a first position adjusting means for adjusting a relative position of said one end of said first optical fiber cable to said receiving optical system based on an intensity of light input from said one end of said first optical fiber cable;

a light transmitting section configured to output light for use in optical communication;

a transmitting optical system configured to guide the light output from said light transmitting section to said optical antenna whose I/O optical path is controlled by said precisely tracking optical system, so that the light is transmitted from said optical antenna to the communication counterpart station;

a second optical fiber cable configured to guide the light output from said light transmitting section to said transmitting optical system, said second optical fiber cable having one end which is located opposite to said transmitting optical system such that said one end of said second optical fiber cable is adjustably movable;

a second position adjusting means for adjusting a relative position of said one end of said second optical fiber cable to said transmitting optical system based on an angle of light from said one end of said second optical fiber cable and a point ahead angle between the space vehicle and the communication counterpart station; and beacon beam transmitting means for transmitting a beacon beam to the communication counterpart station.

2. The optical communication system according to claim 1, wherein each of said first and second position adjusting means three-dimensionally controls either one of the receiving optical system and the transmitting optical system in its movement so as to adjust the position.

3. The optical communication system according to claim 2, wherein said first position adjusting means three-dimensionally controls both first optical fiber and the receiving optical system in its movement so as to adjust the position, and said second position adjusting means three-dimensionally controls both second optical fiber and the transmitting optical system in its movement to so as to adjust the position.

4. The optical communication system according to claim 3, wherein said coarsely tracking means is formed of an optical system, which is provided in the I/O optical path of the optical antenna to be freely adjustable, and adjusted in its movement based on the tracking command.

5. The optical communication system according to claim 4, said light receiving section is positioned to be separated from said receiving optical system through said first optical fiber, and said light transmitting section is positioned to be separated from said transmitting optical system through said second optical fiber.

6. The optical communication system according to claim 5, wherein said beacon beam transmitting means has a beacon optical system and a beacon emitting section connected through the optical fiber, the beacon beam is supplied to the beacon optical system to be transmitted to the communication counterpart station.

7. The optical communication system according to claim 4, wherein said beacon beam transmitting means has a beacon optical system and a beacon emitting section connected through the optical fiber, the beacon beam is supplied to the beacon optical system to be transmitted to the communication counterpart station.

8. The optical communication system according to claim 3, wherein said coarsely tracking means is formed of gimbals to adjust movement of the optical antenna based on the tracking command to track the communication counterpart station.

9. The optical communication system according to claim 8, said light receiving section is positioned to be separated from said receiving optical system through said first optical fiber, and said light transmitting section is positioned to be separated from said transmitting optical system through said second optical fiber.

10. The optical communication system according to claim 9, wherein said beacon beam transmitting means has a beacon optical system and a beacon emitting section connected through the optical fiber, the beacon beam is supplied to the beacon optical system to be transmitted to the communication counterpart station.

11. The optical communication system according to claim 8, wherein said beacon beam transmitting means has a beacon optical system and a beacon emitting section connected through the optical fiber, the beacon beam is supplied to the beacon optical system to be transmitted to the communication counterpart station.

12. The optical communication system according to claim 3, said light receiving section is positioned to be separated from said receiving optical system through said first optical fiber, and said light transmitting section is positioned to be separated from said transmitting optical system through said second optical fiber.

13. The optical communication system according to claim 12, wherein said beacon beam transmitting means has a beacon optical system and a beacon emitting section connected through the optical fiber, the beacon beam is supplied to the beacon optical system to be transmitted to the communication counterpart station.

14. The optical communication system according to claim 3, wherein said beacon beam transmitting means has a beacon optical system and a beacon emitting section connected through the optical fiber, the beacon beam is supplied to the beacon optical system to be transmitted to the communication counterpart station.

15. The optical communication system according to claim 2, wherein said coarsely tracking means is formed of an optical system, which is provided in the I/O optical path of the optical antenna to be freely adjustable, and adjusted in its movement based on the tracking command.

16. The optical communication system according to claim 15, said light receiving section is positioned to be separated from said receiving optical system through said first optical fiber, and said light transmitting section is positioned to be separated from said transmitting optical system through said second optical fiber.

17. The optical communication system according to claim 16, wherein said beacon beam transmitting means has a beacon optical system and a beacon emitting section connected through the optical fiber, the beacon beam is supplied to the beacon optical system to be transmitted to the communication counterpart station.

18. The optical communication system according to claim 2, said light receiving section is positioned to be separated from said receiving optical system through said first optical fiber, and said light transmitting section is positioned to be separated from said transmitting optical system through said second optical fiber.

19. The optical communication system according to claim 18, wherein said beacon beam transmitting means has a beacon optical system and a beacon emitting section connected through the optical fiber, the beacon beam is supplied to the beacon optical system to be transmitted to the communication counterpart station.

20. The optical communication system according to claim 15, wherein said beacon beam transmitting means has a beacon optical system and a beacon emitting section connected through the optical fiber, the beacon beam is supplied to the beacon optical system to be transmitted to the communication counterpart station.

21. The optical communication system according to claim 2, wherein said beacon beam transmitting means has a beacon optical system and a beacon emitting section connected through the optical fiber, the beacon beam is supplied to the beacon optical system to be transmitted to the communication counterpart station.

22. The optical communication system according to claim 2, wherein said coarsely tracking means is formed of gimbals to adjust movement of the optical antenna based on the tracking command to track the communication counterpart station.

23. The optical communication system according to claim 22, said light receiving section is positioned to be separated from said receiving optical system through said first optical fiber, and said light transmitting section is positioned to be separated from said transmitting optical system through said second optical fiber.

24. The optical communication system according to claim 23, wherein said beacon beam transmitting means has a beacon optical system and a beacon emitting section connected through the optical fiber, the beacon beam is supplied to the beacon optical system to be transmitted to the communication counterpart station.

25. The optical communication system according to claim 22, wherein said beacon beam transmitting means has a beacon optical system and a beacon emitting section connected through the optical fiber, the beacon beam is supplied to the beacon optical system to be transmitted to the communication counterpart station.

26. The optical communication system according to claim 1, wherein said coarsely tracking means is formed of an optical system, which is provided in the I/O optical path of the optical antenna to be freely adjustable and adjusted in its movement based on a tracking command.

27. The optical communication system according to claim 26, said light receiving section is positioned to be separated from said receiving optical system through said first optical fiber, and said light transmitting section is positioned to be separated from said transmitting optical system through said second optical fiber.

28. The optical communication system according to claim 27, wherein said beacon beam transmitting means has a beacon optical system and a beacon emitting section connected through the optical fiber, the beacon beam is supplied to the beacon optical system to be transmitted to the communication counterpart station.

29. The optical communication system according to claim 26, wherein said beacon beam transmitting means has a beacon optical system and a beacon emitting section connected through the optical fiber, the beacon beam is supplied to the beacon optical system to be transmitted to the communication counterpart station.

30. The optical communication system according to claim 1, wherein said coarsely tracking means is formed of gimbals to adjust movement of the optical antenna based on a tracking command to track the communication counterpart station.

31. The optical communication system according to claim 30, said light receiving section is positioned to be separated from said receiving optical system through said first optical fiber, and said light transmitting section is positioned to be separated from said transmitting optical system through said second optical fiber.

32. The optical communication system according to claim 31, wherein said beacon beam transmitting means has a beacon optical system and a beacon emitting section connected through the optical fiber, the beacon beam is supplied to the beacon optical system to be transmitted to the communication counterpart station.

33. The optical communication system according to claim 30, wherein said beacon beam transmitting means has a beacon optical system and a beacon emitting section connected through the optical fiber, the beacon beam is supplied to the beacon optical system to be transmitted to the communication counterpart station.

34. The optical communication system according to claim 1, said light receiving section is positioned to be separated from said receiving optical system through said first optical fiber, and said light transmitting section is positioned to be separated from said transmitting optical system through said second optical fiber.

35. The optical communication system according to claim 34, wherein said beacon beam transmitting means has a beacon optical system and a beacon emitting section connected through the optical fiber, the beacon beam is supplied to the beacon optical system to be transmitted to the communication counterpart station.

36. The optical communication system according to claim 1, wherein said beacon beam transmitting means has a beacon optical system and a beacon emitting section connected through the optical fiber, the beacon beam is supplied to the beacon optical system to be transmitted to the communication counterpart station.

* * * * *